US006971402B2

(12) United States Patent
Yamashita (10) Patent No.: US 6,971,402 B2
(45) Date of Patent: Dec. 6, 2005

(54) LIQUID CONTROL VALVE (75) Inventor: Matsuyoshi Yamashita, Fujisawa (JP)

(73) Assignees: NOK Corporation, Tokyo (JP); INAX Corporation, Aichi (JP)

( * ) Notice: Subject to any disclaimer, the term of this patent is extended or adjusted under 35 U.S.C. 154(b) by 233 days.

(21) Appl. No.: 10/469,547

(22) PCT Filed: Mar. 27, 2002

(86) PCT No.: PCT/JP02/03000

§ 371 (c)(1),
(2), (4) Date: Sep. 10, 2003

(87) PCT Pub. No.: WO02/077737

PCT Pub. Date: Oct. 3, 2002

(65) Prior Publication Data
US 2004/0084089 A1 May 6, 2004

(30) Foreign Application Priority Data
Mar. 27, 2001 (JP) .............................. 2001-089194

(51) Int. Cl.⁷ .......................................... G05D 16/10
(52) U.S. Cl. ............ 137/495; 137/505.15; 137/505.25; 137/508
(58) Field of Search .................. 137/495, 505.15, 137/505.25, 508

(56) References Cited

U.S. PATENT DOCUMENTS 1,949,106 A * 2/1934 Manneschmidt, Jr. ....... 137/495
2,842,146 A * 7/1958 Schuster ..................... 137/495
3,183,040 A * 5/1965 Gold .......................... 137/508
3,437,109 A * 4/1969 Egerer et al. ........... 137/505.25
4,516,600 A  5/1985 Sturman et al. ............ 137/495

FOREIGN PATENT DOCUMENTS

| DE | 4231998 A1 | 3/1994 |
| FR | 2696018 | 3/1994 |
| JP | 195137-1994 | 7/1994 |
| JP | 8-7456 | 3/1996 |

* cited by examiner

Primary Examiner—Stephen M. Hepperle
(74) Attorney, Agent, or Firm—Jacobson Holman PLLC

(57) ABSTRACT

In order to achieve an object to provide a liquid control valve of normally close valve type which has both of an outflow side pressure automatic regulating function and a water stop function, the liquid control valve has a pressure regulating piston which moves within a housing for finding a balance point between an outflow side pressure and a spring force of a pressure regulating spring placed so as to resist the outflow side pressure; a movable valve seat which is provided in the pressure regulating piston and moves together with the pressure regulating piston; and a valve body which sits on the valve seat so as to close the valve in accordance with a valve closing force generated by an inflow side pressure and a spring force of a water stop spring, and moves apart from the valve seat so as to open the valve at the time when an external valve opening force larger than the valve closing force is applied, whereby the outflow side pressure automatic regulating function is achieved in accordance with movement of the pressure regulating piston, and the water stop function is achieved in accordance with the valve close.

3 Claims, 7 Drawing Sheets

LIQUID CONTROL VALVE

This is a nationalization of PCT/JP02/03000 filed Mar. 27, 2002 and published in Japanese.

TECHNICAL FIELD

The present invention relates to a liquid control valve for controlling a flow of a liquid, and more particularly to a liquid control valve which has both of an outflow side pressure automatic regulating function and a water stop function. The liquid control valve is, for example, used as a toilet bowl flush valve for supplying a washing water to a toilet bowl.

BACKGROUND ART

In conventional, as the liquid control valve having both of the outflow side pressure automatic regulating function and the water stop function, there is a known structure described in Japanese Utility Model Publication No. 8-7456. However, this conventional art relates to a valve apparatus of normally open valve type which is open in the normal state and is closed as occasion demands. Therefore, this apparatus has a disadvantage that this apparatus can not be used as it is for a toilet bowl flush valve of normally close valve type which is closed in the normal state and is opened as occasion demands so as to supply the washing water.

The present invention is made by taking the points mentioned above into consideration, and an object of the present invention is to provide a liquid control valve of normally close valve type which has both of an outflow side pressure automatic regulating function and a water stop function.

In addition, another object of the present invention is to provide a liquid control valve in which a valve opening force is made small, whereby an excellent valve opening operability can be obtained. Further, another object of the present invention is to provide a liquid control valve which can achieve a throttling function at the time of closing the valve, whereby it is possible to reduce generation of a water hammering.

DISCLOSURE OF THE INVENTION

In order to achieve the objects mentioned above, in accordance with a first aspect of the present invention, there is provided a liquid control valve comprising:

a pressure regulating piston which moves within a housing for finding a balance point between an outflow side pressure and a spring force of a pressure regulating spring placed so as to resist the outflow side pressure;

a movable valve seat which is provided in the pressure regulating piston and moves together with the pressure regulating piston; and a valve body which sits on the valve seat so as to close the valve in accordance with a valve closing force generated by an inflow side pressure and a spring force of a water stop spring, and moves apart from the valve seat so as to open the valve at the time when an external valve opening force larger than the valve closing force is applied, wherein an outflow side pressure automatic regulating function is achieved in accordance with movement of the pressure regulating piston, and a water stop function is achieved in accordance with the valve close.

Further, in accordance with a second aspect of the present invention, there is provided a liquid control valve as recited in the first aspect mentioned above, wherein a back pressure chamber is provided on the back surface side of the valve body so as to introduce the outflow side pressure to the back pressure chamber, and a valve opening direction pressure receiving surface portion is provided in the valve body so as to set an outer diameter of the valve opening direction pressure receiving surface portion slightly smaller than an outer diameter of the valve seat.

Further, in accordance with a third aspect of the present invention, there is provided a liquid control valve as recited in the first aspect or the second aspect mentioned above, wherein a throttle is provided on the side of the valve body so as to be arranged in an overlapping manner on the outer peripheral side of the movable valve seat provided in one end of the pressure regulating piston and achieve a throttling operation.

In the liquid control valve in accordance with the first aspect of the present invention which is provided with the structure mentioned above, since the valve body sits on the valve seat so as to close the valve in accordance with the valve closing force caused by the inflow side pressure and the spring force of the water stop spring, and moves apart from the valve seat so as to open the valve at the time when the external valve opening force larger than the valve closing force is applied, it is possible to construct the valve apparatus of normally close valve type which is closed in the normal state and is opened as occasion demands. Further, since the pressure regulating piston moves so as to find the balance point between the outflow side pressure and the spring force of the pressure regulating spring at the time of opening the valve, and the movable valve seat moves in correspondence to this movement, a valve opening distance between the valve seat and the valve body is automatically regulated in correspondence to a magnitude of the outflow side pressure. Therefore, a flow amount can be automatically regulated in correspondence to the magnitude of the outflow side pressure, and the outflow side pressure can be kept constant.

Further, in addition, in the liquid control valve in accordance with the second aspect of the present invention which is provided with the structure mentioned above, since the back pressure chamber is provided on the back surface side of the valve body, in which the outflow side pressure is introduced to the back pressure chamber, and the valve opening direction pressure receiving surface portion is provided in the valve body, in which the outer diameter of the valve opening direction pressure receiving surface portion is set to be slightly smaller than the outer diameter of the valve seat, a magnitude of the valve closing force in accordance with the inflow side pressure at the time of closing the valve can be set comparatively small. Therefore, it is possible to set the magnitude of the external valve opening force to be comparatively small, in correspondence to this setting.

Further, in the liquid control valve accordance with the third aspect of the present invention which is provided with the structure mentioned above, since the throttle is provided on the side of the valve body so as to be arranged in an overlapping manner on the outer peripheral side of the movable valve seat provided in one end of the pressure regulating piston and achieve the throttling operation, the throttle overlaps the valve seat at the time of closing the valve, whereby the flow amount can be throttled little by little. Therefore, the flow amount and the pressure do not suddenly change, and it is thereby possible to restrict the generation of water hammering.

In this case, the present application includes the following technical matters.

That is, in order to achieve the objects mentioned above, in accordance with one liquid control valve (a pressure reducing valve with a water stop apparatus) proposed by the inventors of the present application, there is provided a liquid control valve comprising:

one inflow port; and
one outflow port, wherein a pressure regulating piston slides within a housing, a pressure regulating spring interposed between the pressure regulating piston and the housing is operated by an outflow side pressure, the pressure regulating piston is operated, self-regulation works so that the outflow side pressure becomes constant, fluid pressure receiving areas in an axial direction with respect to a valve piston are set so that a pressure receiving area in a valve opening direction is a little smaller than a pressure receiving area in a valve closing direction (it is preferable that a difference in pressure receiving area is 0.5 cm$^2$ or less), and a valve opening force by a shaft is reduced.

Further, in accordance with another liquid control valve (a pressure reducing valve with a water stop apparatus), there is provided a liquid control valve comprising:

one inflow port; and
one outflow port, wherein a pressure regulating piston slides within a housing, a pressure regulating spring interposed between the pressure regulating piston and the housing is operated by an outflow side pressure, the pressure regulating piston is operated, self-regulation works so that the outflow side pressure becomes constant, and a valve opening force by a shaft is reduced on the basis of a fluid pressure in the operation (axis) direction which is applied to a valve piston having a warping drum shape structure which is constricted in the middle. Further, in the liquid control valve as mentioned above, a throttle constructed in the valve piston (this throttle is constructed by an independent part from the valve piston, and can be constituted by a structure which is united in accordance with a fixing method by a fixing hole formed on the outer periphery, a hook formed in an outer peripheral portion of the valve piston and the like), and a lip portion constructed in the pressure regulating piston are overlapped in the valve closing state, and are arranged with a certain clearance in a diametrical direction, the throttle is formed so as to be open in a trumpet shape with respect to a lip portion of the pressure regulating piston, and the lip portion constructed in the pressure regulating piston is formed in an edge shape at the front end along an outer peripheral portion.

BEST MODE FOR CARRYING OUT THE INVENTION

Next, a description will be given of an embodiment in accordance with the present invention with reference to the accompanying drawings.

Figure 1:
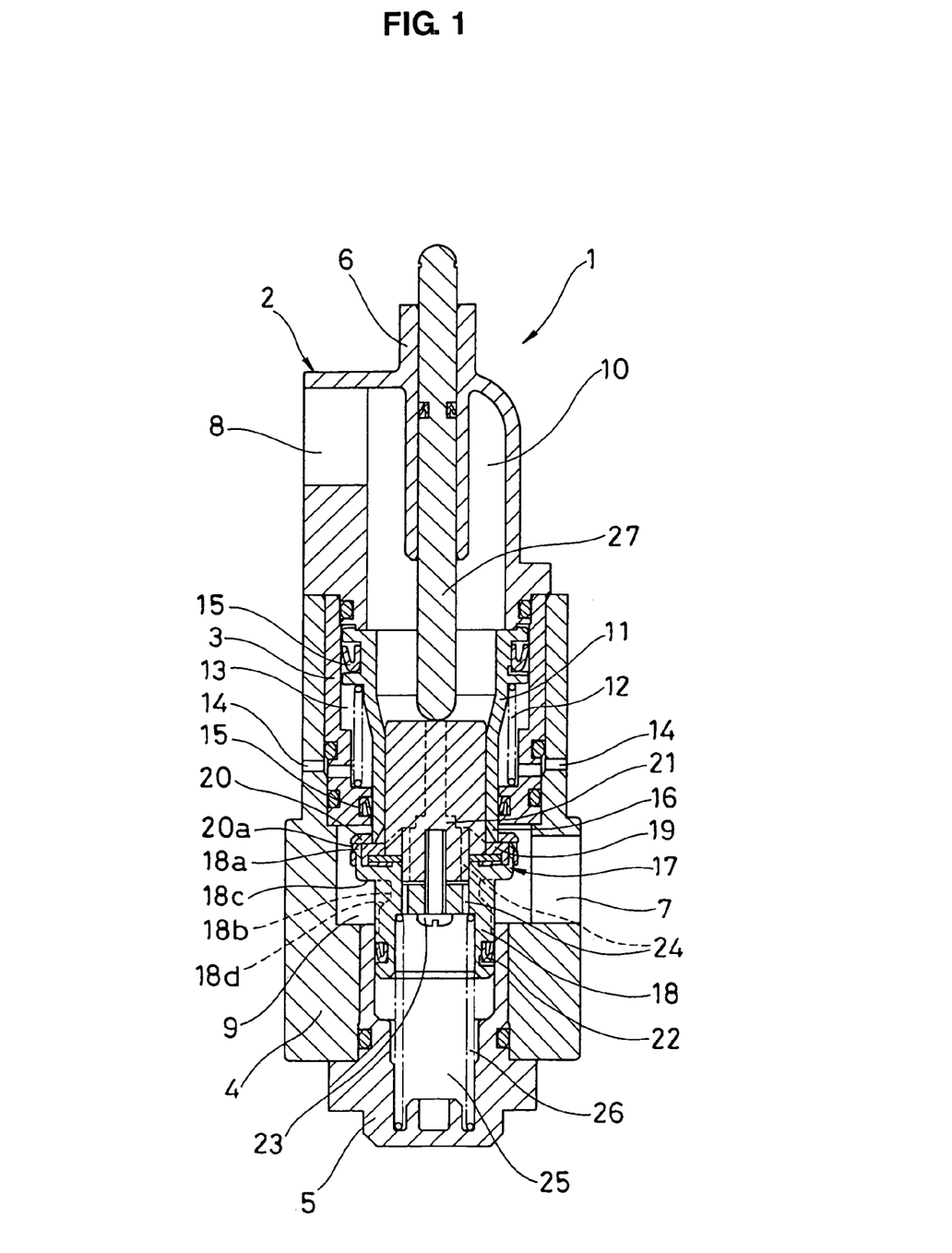
FIG. 1 is a cross sectional view of a liquid control valve in accordance with an embodiment of the present invention.

FIG. 1 shows a cross section of a liquid control valve 1 in accordance with an embodiment of the present invention. The control valve 1 is structured as follows.

That is, first, a housing main body 3, a body 4, a cover 5 and an end cover 6 are combined in a water tight manner, and a housing 2 constituted by these parts is provided. One inflow port 7 and one outflow port 8 for liquid are provided in the housing 2. The inflow port 7 is provided on a side surface of the body 4, and is communicated with an inflow side pressure chamber 9 inside the body 4, and the outflow port 8 is provided on a side surface of the end cover 6, and is communicated with an outflow side pressure chamber 10 inside the end cover 6.

A pressure regulating piston 11 is arranged on the inner peripheral side of the housing main body 3 in the housing 2 in such a manner as to freely slide in the axial direction (the vertical direction in the drawing). This pressure regulating piston 11 is structured such as to move within the housing 2 so as to find a balance point between an outflow side pressure (a secondary pressure) and a spring force of a pressure regulating spring 12 which is placed so as to resist the outflow side pressure. The pressure regulating piston 11 is formed in a tubular shape, and moves in the axial direction along an inner peripheral surface of the housing main body 3 which is formed also in a tubular shape. The pressure regulating spring 12 is arranged between the pressure regulating piston 11 and the housing main body 3 on the outer peripheral side of the pressure regulating piston 11, and elastically energizes the pressure regulating piston 11 toward the outflow direction (the upward direction in the drawing).

A receiving space 13 between the pressure regulating piston 11 and the housing main body 3 in which the pressure regulating spring 12 is arranged is open to the atmospheric air via vent holes 14 which are provided in the housing main body 3 and the body 4. Further, in order to prevent the liquid flowing within the housing 2 from leaking into the space 13, a portion between the pressure regulating piston 11 and the housing main body 3 is sealed by a packing 15.

An inflow side end portion (a lower end portion in the drawing) of the pressure regulating piston 11 formed in the tubular shape is arranged within the inflow side pressure chamber 9 so as to always protrude from the housing main body 3 into the inflow side (the lower side in the drawing). A movable valve seat 16 formed in a ring shape is integrally formed in an inflow side end portion of the pressure regulating piston 11.

Figure 2:
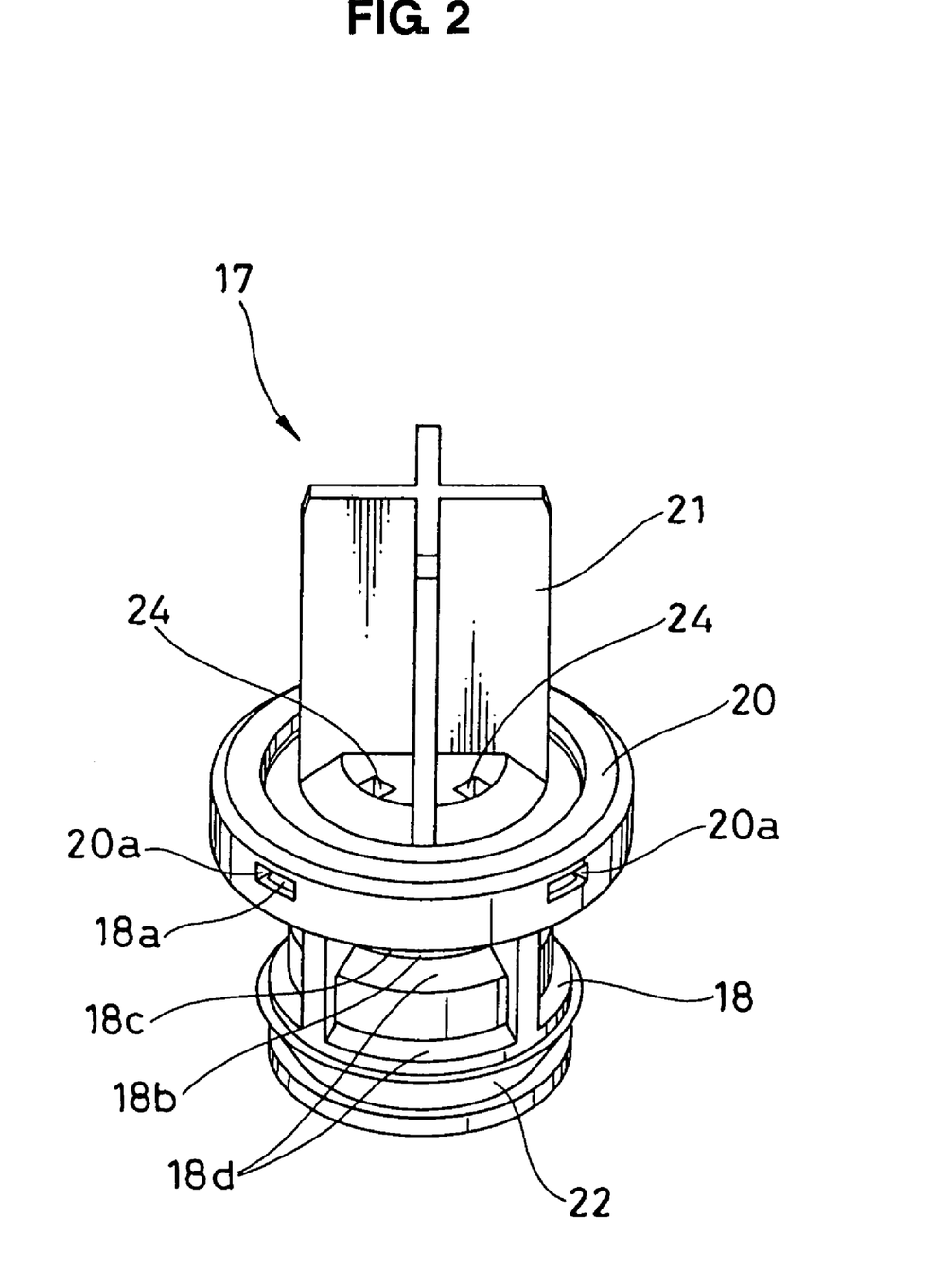
FIG. 2 is a perspective view of a valve body in the control valve.
Figure 3:
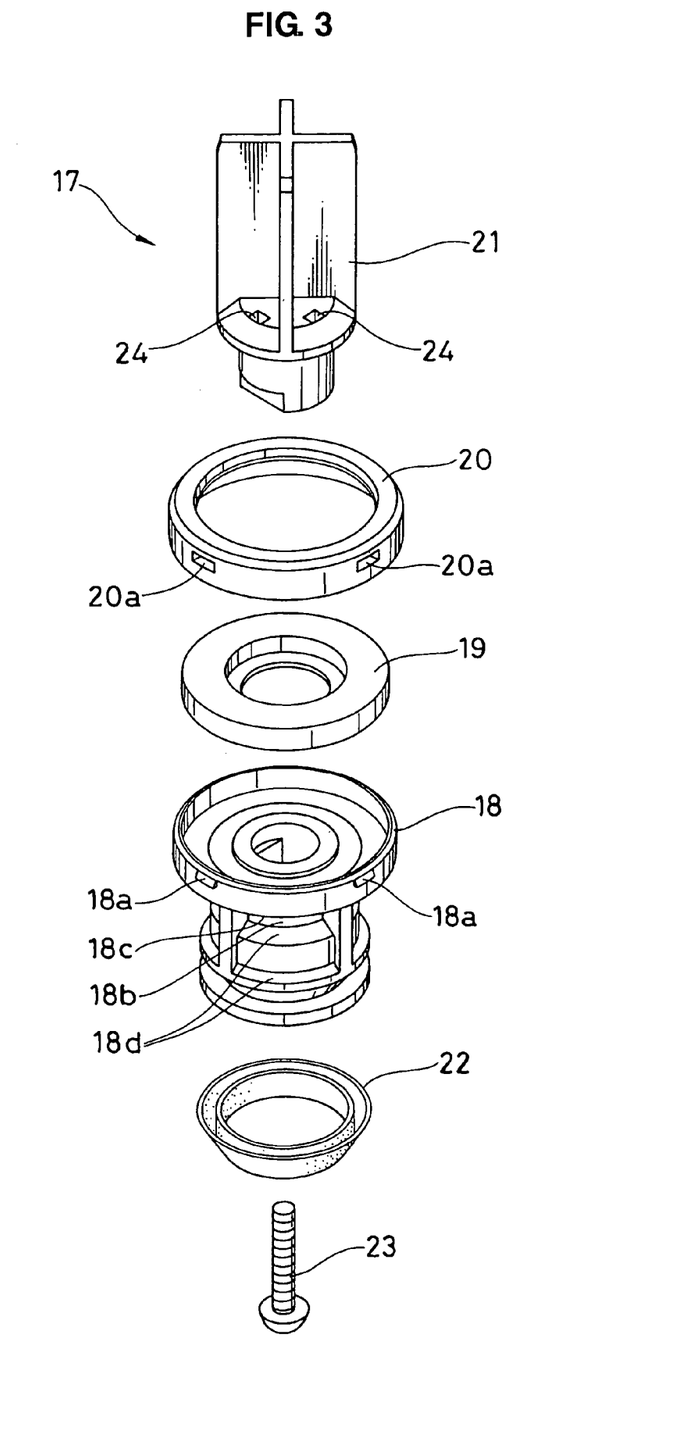
FIG. 3 is an exploded perspective view of the valve body in the control valve.

Further, a valve body 17 is arranged in the inflow side pressure chamber 9 at a position of the inflow side of the valve seat 16 in such a manner as to freely slide in the axial direction. This valve body 17 is constructed by combining a valve piston 18, a valve seat 19, a throttle 20, a retainer 21, a packing 22 and an assembling screw 23, as shown in FIGS. 2 and 3. The valve piston 18 and the retainer 21 are fastened by the assembling screw 23 in the state of holding the valve seat 19 between the valve piston 18 and the retainer 21, and a claw-like projection 18a provided in the valve piston 18 is engaged with a fixing hole 20a provided in the throttle 20, whereby the throttle 20 is fixed to the valve piston 18. Further, a communication portion 24 formed in a through hole shape is provided in the valve body 17 constructed by these parts, in such a manner as to extend through an inner portion of the valve body 17.

Returning to the description of FIG. 1, the retainer 21 of the valve body 17 is slidably inserted to the inner peripheral side of the pressure regulating piston 11, and the lower end portion of the valve piston 18 is slidably inserted to the inner peripheral side of the cover 5 in the housing 2. Accordingly, the valve body 17 can move in the axial direction as a whole, and the valve seat 19 is brought into contact with the valve seat 16 at one end of the stroke of the valve body 17 so as to close the valve.

The space within the cover 5 into which the valve piston 18 in the valve body 17 is slidably inserted is formed as a back pressure chamber 25, and a water stop spring 26 for elastically energizing the valve body 17 in the valve closing direction is arranged in the back pressure chamber 25. Further, the back pressure chamber 25 is partitioned from the inflow side pressure chamber 9 by the packing 22 mentioned above, and since the communication portion 24 is provided in the valve body 17 as mentioned above, the outflow side pressure is always introduced into the back pressure chamber 25.

In the control valve 1, a valve closing force for making the valve body 17 sit on the valve seat 16 is constituted by a sum of a valve closing force caused by an inflow side pressure (a primary pressure) which is introduced into the inflow side pressure chamber 9 from the inflow port 7, and a valve closing force caused by a spring force of the water stop spring 26. Between them, a magnitude of the valve closing force caused by the inflow side pressure is set to be comparatively small in accordance with the following manner.

That is, a neck portion 18b which is positioned substantially in the middle of the outer peripheral surface of the valve piston 18 in the axial direction and is formed in a shape having a reduced diameter, is provided in the valve piston 18 of the valve body 17 arranged within the inflow side pressure chamber 9 mentioned above. A valve closing direction pressure receiving surface portion 18c is provided in the outflow side (the upper side in the drawing) of the neck portion 18b, and a valve opening direction pressure receiving surface portion 18d is provided in the opposite inflow side (the lower side in the drawing). The former valve closing direction pressure receiving surface portion 18c is structured such as to energize the valve body 17 toward the valve closing direction at the time when the inflow side pressure is applied to the valve closing direction pressure receiving surface portion 18c, and the latter valve opening direction pressure receiving surface portion 18d is structured such as to energize the valve body 17 toward the valve opening direction at the time when the inflow side pressure is applied to the valve opening direction pressure receiving surface portion 18d. A pressure receiving area of the latter valve opening direction pressure receiving surface portion 18d is set to be smaller than a pressure receiving area of the former valve closing direction pressure receiving surface portion 18c, and an outer diameter $\phi A$ of the valve opening direction pressure receiving surface portion 18d is set to be slightly smaller than an outer diameter $\phi B$ of the valve seat 16. Accordingly, a valve closing force F generated by the inflow side pressure at a time of closing the valve is set to be comparatively small by the following formula.

$$F = (SB - SA) \times P \qquad (1)$$

In this formula, SB is a substantial pressure receiving area in the valve closing direction of the valve body 17 at the time of closing the valve, SA is a substantial pressure receiving area in the valve opening direction of the valve body 17 at the time of closing the valve, and P is an inflow side pressure.

In accordance with this, a magnitude of a whole valve closing force which is constituted by the sum of the inflow side pressure and the spring force of the water stop spring 26 is set to be comparatively small (in this case, in the drawing, since a cross section is cut by at reinforcing rib provided in the outer peripheral surface of the valve piston 18 (since the reinforcing rib is described by a solid line and a hatching for showing the cross section is added), the neck portion 18b, the valve closing direction pressure receiving surface portion 18c and the valve opening direction pressure receiving surface portion 18d are described by a dotted line in a whole or a part thereof).

On the contrary, a valve opening force for moving the valve body 17 apart from the valve seat 16 is constituted by a pressing force in the axial direction which is applied to the valve body 17 via a shaft (rod) 27 from an external drive source (not shown), and when a magnitude of the external valve opening force becomes more than the magnitude of the valve closing force mentioned above, the valve body 17 is operated so as to open the valve. The shaft 27 is held by the end cover 6 in the housing 2 so as to freely slide in the axial direction. When the shaft 27 moves in the inflow direction (the downward direction in the drawing) in the valve closing state, the shaft presses the valve body 17 so as to open the valve. Further, when the shaft 27 moves in the outflow direction (the upward direction in the drawing) in the valve opening state, the valve body 17 is operated by the valve closing force so as to close the valve.

Figure 7:
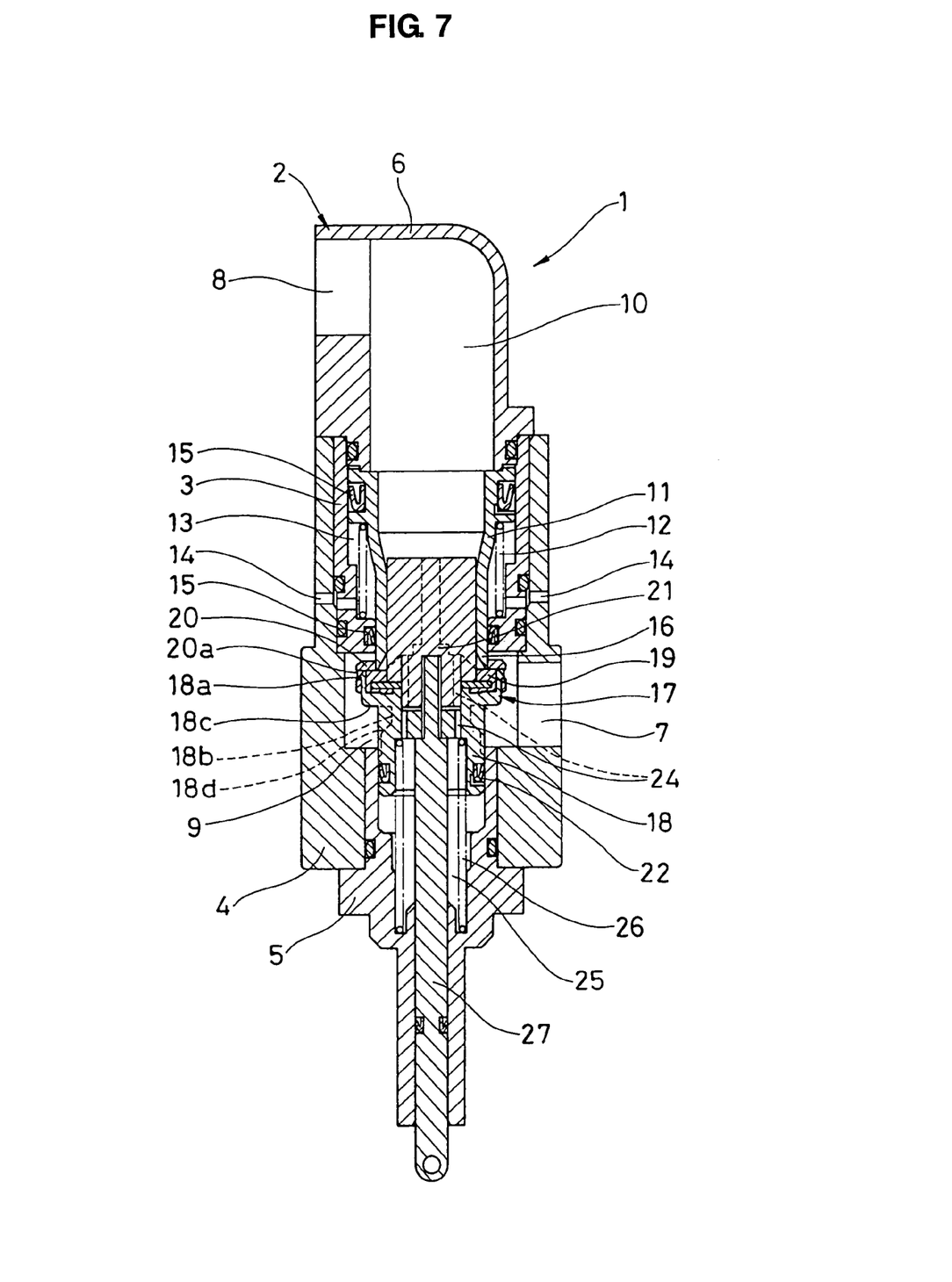
FIG. 7 is a cross sectional view of a liquid control valve in accordance with another embodiment of the present invention.

In this case, in accordance with another embodiment, the shaft 27 may be arranged on the side of the back pressure chamber 25 which corresponds to the opposite side in the axial direction, as shown in FIG. 7. In this case, the shaft 27 pulls the valve body 17 at a time of opening the valve.

Further, the annular valve seat 16 which is integrally formed at one end of the tubular pressure regulating piston 11 is structured such that an outer peripheral surface is formed into a straight surface in the axial direction, and an inner peripheral surface is formed in a taper shape. Accordingly, the valve seat 16 is formed in a lip shape, the cross section of which has a tapered edge shape. Further, the annular throttle 20 which is provided in the valve body 17 as a part is arranged on the outer peripheral side of the valve seat 16 in an overlapping manner in the axial direction so as to achieve a throttle operation with respect to the pressure at a time of closing the valve. The throttle 20 is formed so that the inner diameter has a clearance of 0.1 mm or less with respect to an outer diameter of the valve seat 16, which is formed in the lip shape, in the pressure regulating piston 11, and a length thereof is 0.5 mm or more. Further, a tip thereof (a leading end portion of the inner peripheral surface) is formed in a taper shape, and is formed so as to be expanded in a trumpet shape.

Figure 4:
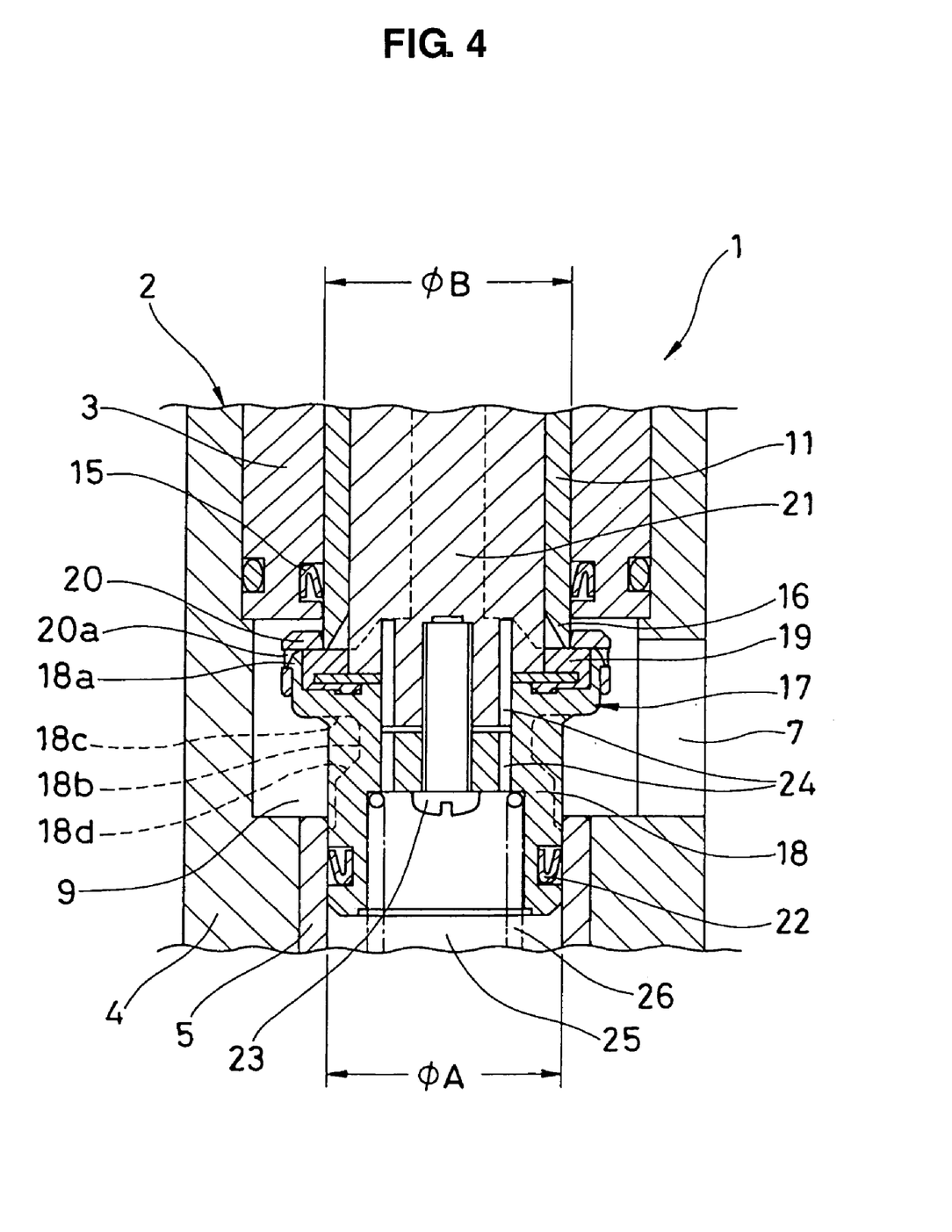
FIG. 4 is an enlarged cross sectional view of a main portion which shows a valve close state of the control valve.
Figure 5:
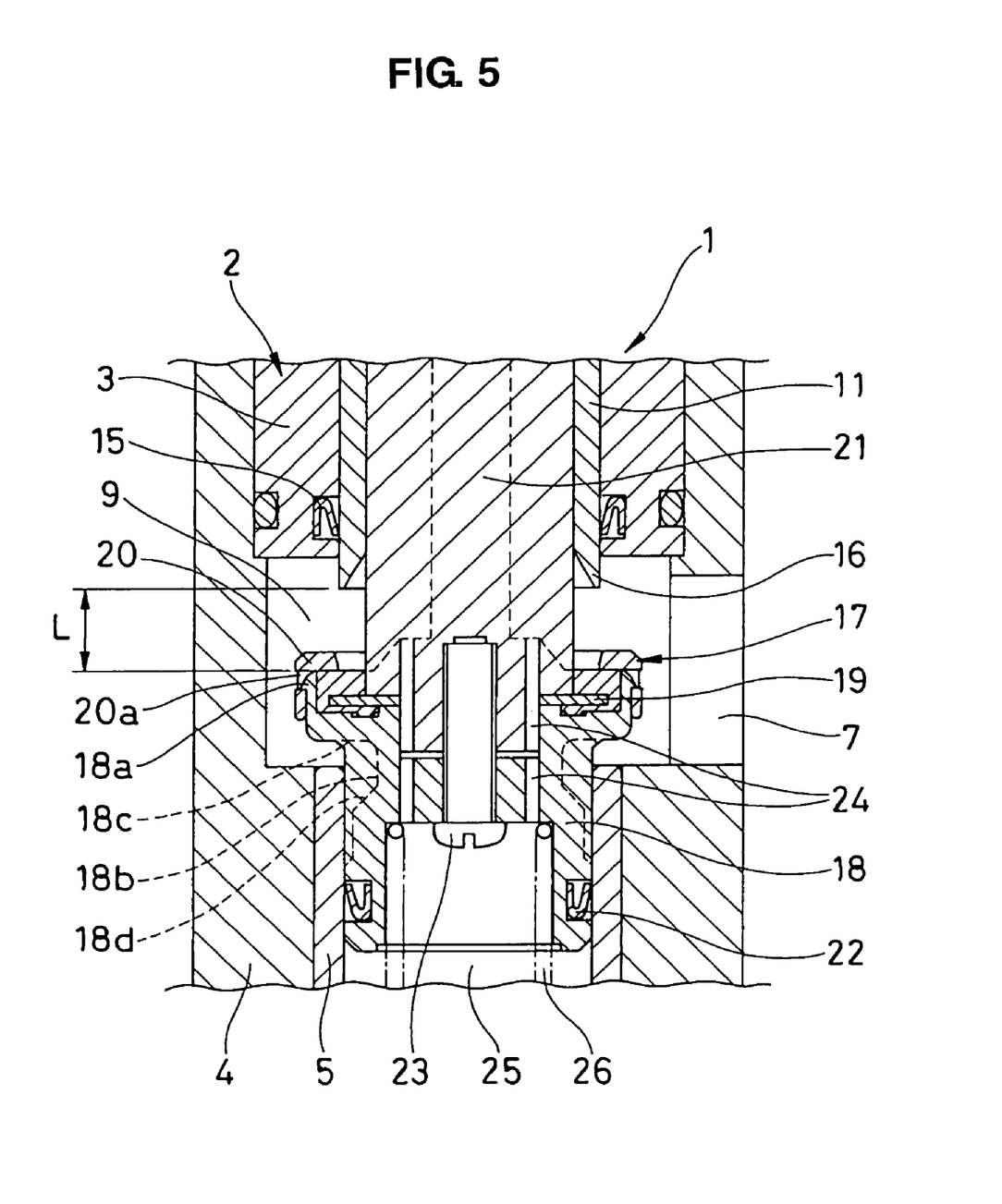
FIG. 5 is an enlarged cross sectional view of the main portion which shows a valve open state of the control valve.
Figure 6:
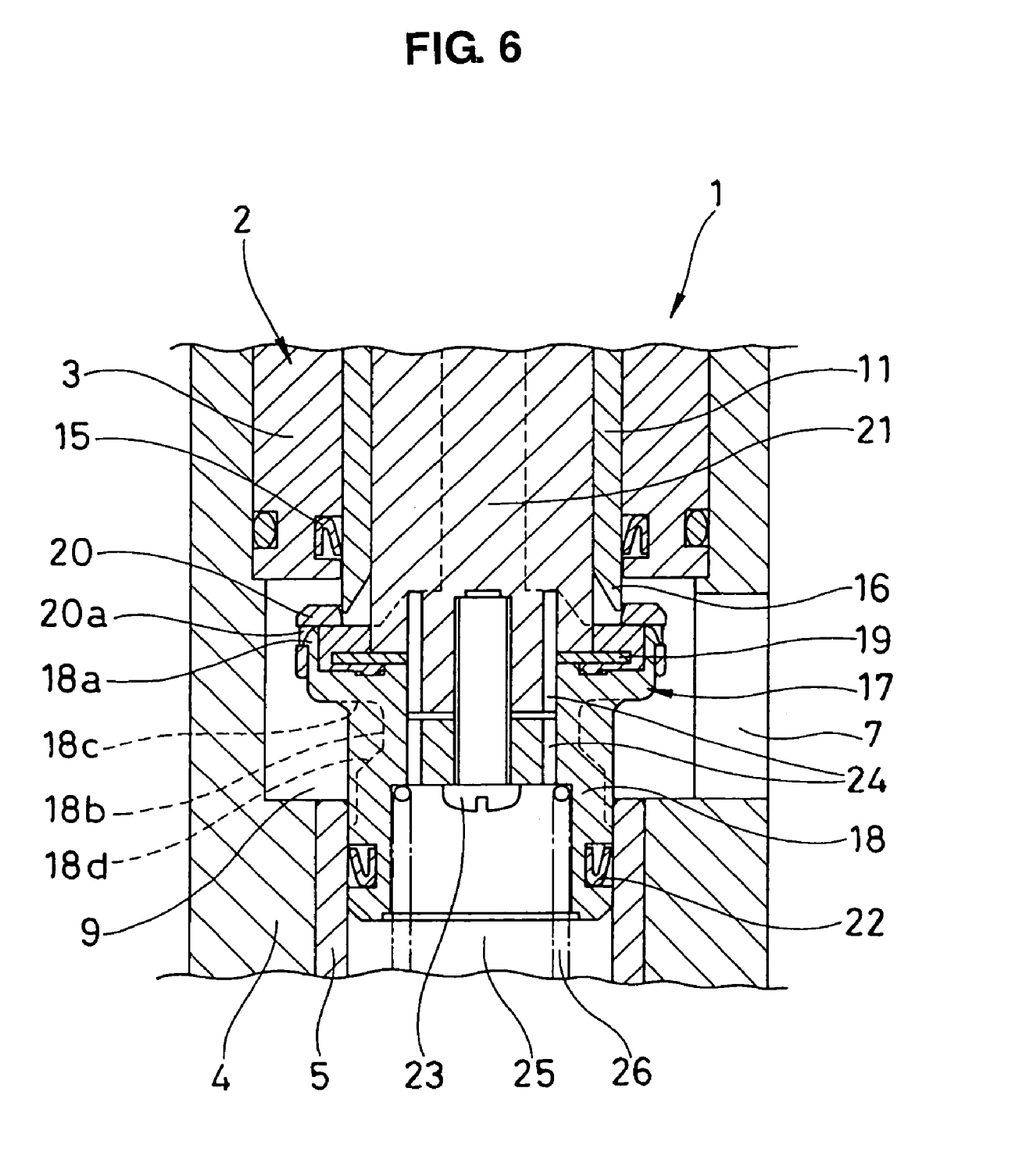
FIG. 6 is an enlarged cross sectional view of the main portion which shows a transitional state to close the control valve.

The liquid control valve 1 having the structure mentioned above is constructed as a valve apparatus of normally close valve type because the valve body 17 sits on the valve seat 16 so as to close the valve in accordance with the valve closing force caused by the inflow side pressure and the spring force of the water stop spring 26, as a main portion thereof is shown in FIG. 4 in an enlarged manner, and moves apart from the valve seat 16 so as to open the valve only when the external valve opening force larger than the valve closing force mentioned above is applied, as shown in FIG. 5. Further, as shown in FIG. 6, at a time of opening the valve, the pressure regulating piston 11 moves in the axial direction so as to find the balance point between the outflow side pressure and the spring force of the pressure regulating spring 12, and the movable valve seat 16 integrally formed at one end of the pressure regulating piston 11 accordingly moves in the axial direction. Therefore, a valve opening distance L between the valve seat 16 and the valve body 17 is automatically regulated in correspondence to the magnitude of the outflow side pressure so that the valve is widely opened at the time when the outflow side pressure is high, and the valve is narrowly opened at the time when the outflow side pressure is low. Accordingly, a flow amount is automatically regulated in correspondence to the magnitude of the outflow side pressure, and the outflow side pressure is consequently kept constant, whereby there can be achieved an outflow side pressure automatic regulating function of automatically keeping the magnitude of the outflow side pressure in a fixed magnitude. Therefore, it is possible to provide the fluid control valve 1 of normally close valve type which has both of the outflow side pressure automatic regulating function obtained by the movement of the pressure regulating piston 12, and the water stop function obtained by the valve close mentioned above.

Further, in this liquid control valve 1, the back pressure chamber 25 is provided on the back surface side of the valve body 17, in which the outflow side pressure is introduced to the back pressure chamber 25 via the communication portion 24 provided in the valve body 17, and the valve opening direction pressure receiving surface portion 18$d$ is provided in the valve body 17, in which the outer diameter $\phi A$ of the valve opening direction pressure receiving surface portion 18$d$ is set to be slightly smaller than the outer diameter $\phi B$ of the valve seat 16. Accordingly, the magnitude of the valve closing force at the time of closing the valve is set to be comparatively small. Therefore, since the magnitude of the external valve opening force input from the external can be set to be comparatively small, it is possible to provide the fluid control valve 1 which can achieve an excellent valve opening operability. In the case that the control valve 1 is used as the toilet bowl flushing valve, this valve opening operability is brought out particularly as a response characteristic, and is great in a water saving effect, a power saving effect and the like. Further, since the external drive source having a low output and a compact size can be used, it is possible to achieve a space saving and compactifying in a whole product. Further, in the case that the control valve 1 is used as the toilet bowl flushing valve as mentioned above, it is preferable that the pressure receiving area difference (SB−SA) in the formula (1) mentioned above is set to be 0.5 cm$^2$ or less.

Further, in the control valve 1, since the throttle 20 is provided in the valve body 17 as a part thereof, and the throttle 20 overlaps the outer peripheral side of the valve seat 16 during a step that the valve is going to close, it is possible to throttle the flow amount little by little on the basis of the throttling effect. Therefore, the flow amount and the pressure do not suddenly change, and it is accordingly possible to prevent the water hammering from being generated. Further, even in the case that the inflow side pressure is high, it is possible to smoothly close the valve without generating any vibration. Further, the flow amount is throttled in the throttle 20, whereby the valve closing force is generated in the portion having the diameter larger than the valve seat 16, and the valve closing force larger than that in the case of having no throttle is generated. Therefore, it is possible to improve a valve closing characteristic, and a stable valve closing motion can be obtained.

Further, in the control valve 1, in the case that the inflow side pressure ascends abnormally in the water stop state, this abnormal pressure is relieved to the outflow side. Accordingly, the inflow side housing 2 does not require so much strength against the abnormal pressure. Therefore, a material of the housing 2 can be changed from a conventionally used metal to a comparatively brittle resin or the like, whereby it is possible to achieve a weight saving, a cost reduction and the like in the product. In this relief mechanism, since the pressure receiving area difference (SB−SA) in the formula (1) mentioned above is set minute as mentioned above, an increase in the seal surface pressure (a contact pressure between the valve body 17 and the valve seat 16) is small even when the inflow side pressure is increased, whereby the abnormal pressure is generated by a leak from the portion between the valve body 17 and the valve seat 16 when the pressure exceeds a certain value.

Further, in the control valve 1, since the valve seat 16, on which the valve body 17 sits at the time of closing the valve, is provided in one end portion of the pressure regulating piston 11 as the movable valve seat 16, it is not necessary to arrange a fixed valve seat in the housing 2. Therefore, it is possible to simplify the shape of the housing and make the housing 2 compact at this degree.

EFFECT OF THE INVENTION AND INDUSTRIAL APPLICABILITY

The present invention achieves the following effects.

That is, first, in the liquid control valve in accordance with the first aspect of the present invention which is provided with the structure mentioned above, since the valve body sits on the valve seat so as to close the valve in accordance with the valve closing force caused by the inflow side pressure and the spring force of the water stop spring, and moves apart from the valve seat so as to open the valve at the time when the external valve opening force larger than the valve closing force is applied, it is possible to construct the valve apparatus of normally close valve type which is closed in the normal state and is opened as occasion demands. Further, since the pressure regulating piston moves so as to find the balance point between the outflow side pressure and the spring force of the pressure regulating spring at the time of opening the valve, and the movable valve seat moves in correspondence to this movement, a valve opening distance between the valve seat and the valve body is automatically regulated in correspondence to a magnitude of the outflow side pressure. Therefore, a flow amount can be automatically regulated in correspondence to the magnitude of the outflow side pressure, and the outflow side pressure can be kept constant. Accordingly, it is possible to achieve the outflow side pressure automatic regulating function of automatically keeping the magnitude of the outflow side pressure constant. Therefore, it is possible to provide the fluid control valve of normally close valve type which has both of the outflow side pressure automatic regulating function on the basis of the movement of the pressure regulating piston and the water stop function caused by the valve close mentioned above.

Further, in this liquid control valve, since the valve seat, on which the valve body sits at the time of closing the valve, is provided in one end of the pressure regulating piston as the movable valve seat, it is not necessary to independently arrange the fixed valve seat in the housing. Therefore, it is possible to simplify the shape of the housing and make the housing compact at this degree.

Further, in addition, in the liquid control valve in accordance with the second aspect of the present invention which is provided with the structure mentioned above, since the back pressure chamber is provided on the back surface side of the valve body, in which the outflow side pressure is introduced to the back pressure chamber, and the valve opening direction pressure receiving surface portion is provided in the valve body, in which the outer diameter of the valve opening direction pressure receiving surface portion is set to be slightly smaller than the outer diameter of the valve seat, a magnitude of the valve closing force in accordance with the inflow side pressure at a time of closing the valve can be set comparatively small. Therefore, it is possible to set the magnitude of the external valve opening force which is input from the external to be comparatively small, in correspondence to this setting. Accordingly, it is possible to provide the liquid control valve which can achieve an excellent valve opening operability. In the case that the control valve is used as the toilet bowl flushing valve or the like, the valve opening operability is brought out particularly as a response characteristic, and is great in a water saving effect, a power saving effect and the like. Further, since the external drive source having a low output and a compact size can be used, it is possible to achieve a space saving and compactifying in the product.

Further, in the liquid control valve in accordance with the third aspect of the present invention which is provided with the structure mentioned above, since the throttle is provided in the valve body as a part thereof, and the throttle overlaps the outer peripheral side of the valve seat during a step that the valve is going to close, it is possible to throttle the flow amount little by little on the basis of the throttling effect. Therefore, it is possible to prevent the water hammering from being generated due to the sudden change in pressure. Further, even in the case that the inflow side pressure is high, it is possible to smoothly close the valve without generating any vibration. Further, the flow amount is throttled in the throttle, whereby the valve closing force is generated in the portion having the diameter larger than the valve seat 16, and the valve closing force larger than that in the case of having no throttle is generated. Therefore, it is possible to improve a valve closing characteristic, and a stable valve closing motion can be obtained.

What is claimed is:

1. A liquid control valve comprising:

a pressure regulating piston (11) which moves within a housing (2) for finding a balance point between an outflow side pressure and a spring force of a pressure regulating spring (12) placed so as to resist the outflow side pressure;

a movable valve seat (16) which is provided in the pressure regulating piston (11) and moves together with the pressure regulating piston (11); and a valve body (17) which sits on the valve seat (16) so as to close the valve in accordance with a valve closing force generated by an inflow side pressure and a spring force of a water stop spring (26), and moves apart from the valve seat (16) so as to open the valve at the time when an external valve opening force larger than the valve closing force is applied, wherein an outflow side pressure automatic regulating function is achieved in accordance with movement of the pressure regulating piston (11), and a water stop function is achieved in accordance with the valve close.

2. A liquid control valve as claimed in claim 1, wherein a back pressure chamber (25) is provided on the back surface side of the valve body (17) so as to introduce the outflow side pressure to the back pressure chamber (25), and a valve opening direction pressure receiving surface portion (18*d*) is provided in the valve body (17) so as to set an outer diameter ($\phi$A) of the valve opening direction pressure receiving surface portion (18*d*) slightly smaller than an outer diameter ($\phi$B) of the valve seat (16).

3. A liquid control valve as claimed in claim 1, wherein a throttle (20) is provided on the side of the valve body (17) so as to be arranged in an overlapping manner on the outer peripheral side of the movable valve seat (16) provided in one end of the pressure regulating piston (11) and achieve a throttling operation.

* * * * *